United States Patent
Zhang et al.

(10) Patent No.: US 8,509,708 B2
(45) Date of Patent: Aug. 13, 2013

(54) REMOTE FRONT-END FOR A MULTI-ANTENNA STATION

(75) Inventors: Xiangdong Zhang, Westford, MA (US); Jay Rodney Walton, Carlisle, MA (US)

(73) Assignee: QUALCOMM Incorporated, San Diego, CA (US)

( * ) Notice: Subject to any disclaimer, the term of this patent is extended or adjusted under 35 U.S.C. 154(b) by 1139 days.

(21) Appl. No.: 12/352,199

(22) Filed: Jan. 12, 2009

(65) Prior Publication Data

US 2009/0124214 A1 May 14, 2009

Related U.S. Application Data

(62) Division of application No. 11/075,005, filed on Mar. 7, 2005, now abandoned.

(60) Provisional application No. 60/615,891, filed on Oct. 4, 2004.

(51) Int. Cl.
*H04B 1/38* (2006.01)

(52) U.S. Cl.
USPC ............... 455/73; 455/75; 455/78; 455/82; 455/561

(58) Field of Classification Search
USPC .......................................................... 455/73
See application file for complete search history.

(56) References Cited

U.S. PATENT DOCUMENTS

| | | | |
|---|---|---|---|
| 5,657,459 A | 8/1997 | Yanagisawa et al. | |
| 5,748,669 A | 5/1998 | Yada | |
| 5,812,951 A | 9/1998 | Ganesan et al. | |
| 5,887,267 A * | 3/1999 | Fugaro | 455/561 |
| 6,801,788 B1 * | 10/2004 | Csapo et al. | 455/561 |
| 7,212,788 B2 * | 5/2007 | Weber et al. | 455/78 |
| 7,369,096 B2 | 5/2008 | Castaneda et al. | |
| 2001/0015999 A1 | 8/2001 | Nam | |
| 2003/0134601 A1 * | 7/2003 | Jou | 455/82 |
| 2003/0203743 A1 | 10/2003 | Sugar et al. | |

(Continued)

FOREIGN PATENT DOCUMENTS

| | | |
|---|---|---|
| CN | 1134067 A | 10/1996 |
| DE | 10114531 A1 | 10/2002 |

(Continued)

OTHER PUBLICATIONS

JP OA dated Mar. 11, 2010 for JP Application Serial No. 2007-535704, 2 pages.

(Continued)

*Primary Examiner* — Ajibola Akinyemi
(74) *Attorney, Agent, or Firm* — QUALCOMM Patent Group; James Hunt Yancey, Jr.

(57) ABSTRACT

A multi-antenna station has multiple remote front-ends coupled to multiple antennas. Each remote front-end includes a power amplifier (PA), a low noise amplifier (LNA), and first and second coupling units. On the transmit path, a first RF signal is received via a first port, routed by the first coupling unit to the power amplifier, amplified to obtain the desired output power level, and routed by the second coupling unit to a second port for transmission via the antenna. On the receive path, a second RF signal is received via the second port, routed by the second coupling unit to the LNA, amplified to obtain a higher signal level, and routed by the first coupling unit to the first port for transmission to the transceiver.

6 Claims, 8 Drawing Sheets

(56) References Cited

U.S. PATENT DOCUMENTS

| | | |
|---|---|---|
| 2004/0033787 A1 | 2/2004 | Weber et al. |
| 2004/0137854 A1 | 7/2004 | Ge |
| 2005/0264352 A1 | 12/2005 | Ichitsubo et al. |
| 2006/0003795 A1 | 1/2006 | Yamanaka et al. |
| 2006/0063494 A1 | 3/2006 | Zhang et al. |
| 2010/0099366 A1* | 4/2010 | Sugar et al. .............. 455/75 |

FOREIGN PATENT DOCUMENTS

| | | |
|---|---|---|
| EP | 0729238 | 8/1996 |
| EP | 1111812 A1 | 12/1999 |
| EP | 1320212 A2 | 12/2002 |
| GB | 2354674 A | 1/2009 |
| JP | 2876894 | 11/1993 |
| JP | 06-037666 | 2/1994 |
| JP | 06-195157 | 7/1994 |
| JP | 08-149548 | 6/1996 |
| JP | 09-046110 | 2/1997 |
| JP | 09-55681 | 2/1997 |
| JP | 11-008576 | 1/1999 |
| JP | 2001-211473 | 8/2001 |
| JP | 2001-241234 | 9/2001 |
| JP | 2002098751 A | 4/2002 |
| JP | 2002-171194 | 6/2002 |
| JP | 2002-544623 | 12/2002 |
| JP | 2003-18075 | 1/2003 |
| JP | 2003-244166 | 8/2003 |
| JP | 2004-153800 | 5/2004 |
| JP | 2004-229088 | 8/2004 |
| JP | 2004-260588 | 9/2004 |
| WO | 02078198 | 10/2002 |

OTHER PUBLICATIONS

CN OA dated Feb. 25, 2010 for CN Application Serial No. 200580041534.8, 12 pages.
EP OA dated Aug. 2, 2011 for EP Application Serial No. 05801139.6, 4 pages.
JP OA mailed Sep. 14, 2010 for JP Application Serial No. 2007-535704, 2 pages.
CN OA dated Aug. 27, 2010 for CN Application Serial No. 200580041534.8, 21 pages.
JP OA Dated Nov. 27, 2009 for JP Application No. 2007-535704; 1 Pg.
International Search Report and Written Opinion dated Apr. 19, 2006 for PCT Application Serial No. PCT/US2005/034182, 17 pages.
Non-Final OA mailed Mar. 21, 2008 for U.S. Appl. No. 11/075,005, 18 pages.
Final OA mailed Sep. 19, 2008 for U.S. Appl. No. 11/075,005, 14 pages.
EP OA dated Feb. 9, 11 for EP Application Serial No. 05801139.6, 3 pages.
Shigetoshi Nakamura, "Latest Windows 98-Compliant Peripheral Equipment, Its Fun to Use USB," Sofmap World Hyper, Digital Communication Corporation, Japan, Oct. 1998, vol. 38, pp. 154-155.

* cited by examiner

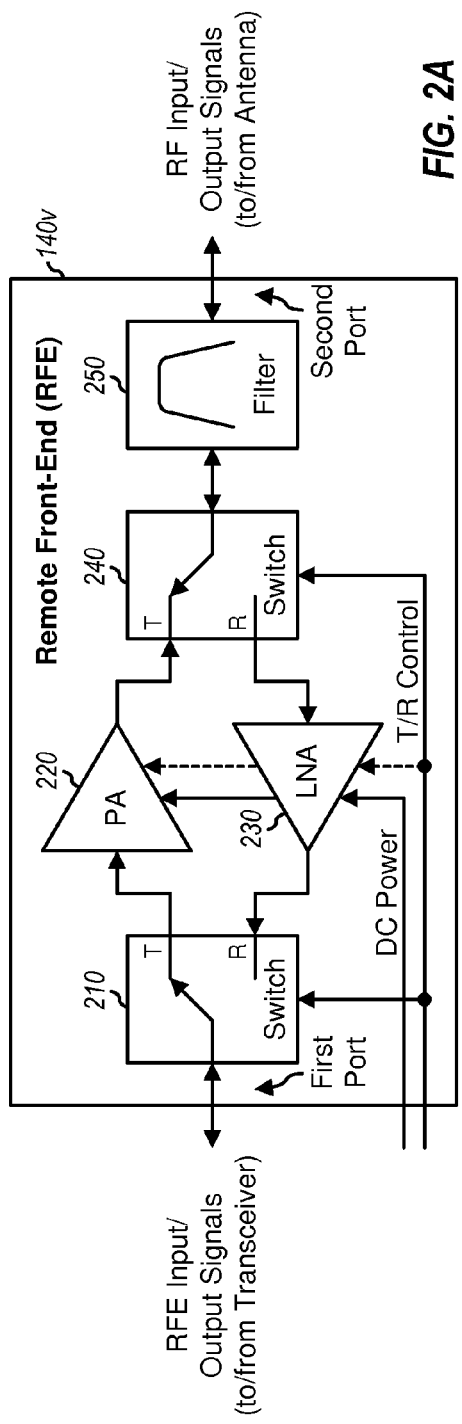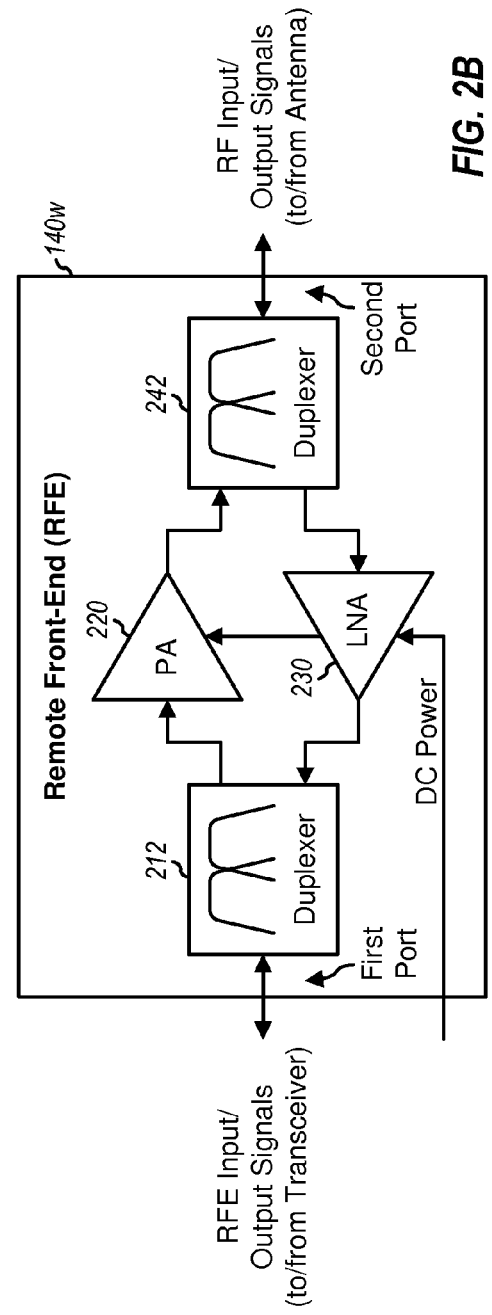

REMOTE FRONT-END FOR A MULTI-ANTENNA STATION

CROSS REFERENCE TO RELATED APPLICATIONS

This application is a divisional of U.S. patent application Ser. No. 11/075,005, filed Mar. 7, 2005, entitled "REMOTE FRONT-END FOR A MULTI-ANTENNA STATION", which claims priority to Provisional Application Ser. No. 60/615,891, filed Oct. 4, 2004, entitled "REMOTE FRONT-END FOR A MULTI-ANTENNA STATION". The entireties of the aforementioned applications are incorporated herein by reference.

BACKGROUND

1. Field

The present invention relates generally to electronics, and more specifically to a wireless multi-antenna station.

2. Background

A multiple-input multiple-output (MIMO) communication system employs multiple (T) transmit antennas at a transmitting station and multiple (R) receive antennas at a receiving station for data transmission. A MIMO channel formed by the T transmit antennas and R receive antennas may be decomposed into S spatial channels, where $S \leq \min \{T, R\}$. The S spatial channels may be used to transmit data in parallel to achieve higher throughput and/or redundantly to achieve greater reliability.

A multi-antenna station is equipped with multiple antennas that may be used for data transmission and reception. Each antenna is typically associated with a transceiver that includes (1) transmit circuitry used to process a baseband output signal and generate a radio frequency (RF) output signal suitable for transmission via the antenna and (2) receive circuitry used to process an RF input signal received via the antenna and generate a baseband input signal. The multi-antenna station also has digital circuitry for processing data for transmission and reception.

The antennas of the multi-antenna station may not be located near the transceivers for various reasons. For example, it may be desirable to place the antennas at different locations and/or with sufficient separation in order to (1) decorrelate the spatial channels as much as possible and (2) achieve good reception of RF input signals and transmission of RF output signals. As another example, the multi-antenna station may be designed such that it is not possible to locate the antennas near their associated transceivers. In any case, if the antennas are not located near the transceivers, then relatively long RF cables or transmission lines are needed to connect the antennas to the transceivers. A fair amount of signal loss may result from the long connection between the antennas and the transceivers. This signal loss increases the receiver noise figure on the receive path and lowers the transmit power level on the transmit path. These effects make the system less power efficient and degrade performance.

There is therefore a need in the art for techniques to connect the antennas to the transceivers.

SUMMARY

Techniques for connecting multiple antennas to multiple transceivers in a multi-antenna station are described herein. According to an embodiment of the invention, a station equipped with multiple antennas is described which includes multiple transceivers and multiple remote front-ends. Each transceiver performs signal conditioning for RF signals transmitted and received via an associated antenna. Each remote front-end couples to an associated transceiver and an associated antenna, amplifies a first RF signal received from the associated transceiver to generate a first amplified RF signal for transmission from the associated antenna, and further amplifies a second RF signal received from the associated antenna to generate a second amplified RF signal for transmission to the associated transceiver.

According to another embodiment, a station equipped with multiple antennas is described which includes means for performing signal conditioning for RF signals transmitted and received via the antennas, means for power amplifying RF modulated signals received from the means for performing signal conditioning to generate amplified RF modulated signals for transmission from the antennas, and means for low noise amplifying RF input signals received from the antennas to generate amplified RF input signals for transmission to the means for performing signal conditioning. The means for power amplifying and the means for low noise amplifying are separate from the means for performing signal conditioning.

According to yet another embodiment, an apparatus suitable for use with a station equipped with multiple antennas is described which includes first and second amplifiers and first and second coupling units. The first amplifier receives and amplifies a first radio frequency (RF) signal and provides a first amplified RF signal. The second amplifier receives and amplifies a second RF signal and provides a second amplified RF signal. The first coupling unit couples the first RF signal from a first port to the first amplifier and couples the second amplified RF signal from the second amplifier to the first port. The second coupling unit couples the first amplified RF signal from the first amplifier to a second port and couples the second RF signal from the second port to the second amplifier.

According to yet another embodiment, an apparatus suitable for use with a station equipped with multiple antennas is described which includes means for amplifying a first RF signal to generate a first amplified RF signal, means for amplifying a second RF signal to generate a second amplified RF signal, means for coupling the first RF signal from a first port to the means for amplifying the first RF signal, means for coupling the first amplified RF signal to a second port, means for coupling the second RF signal from the second port to the means for amplifying the second RF signal, and means for coupling the second amplified RF signal to the first port.

According to yet another embodiment, a transceiver module for use in a station equipped with multiple antennas is described which includes first and second transceivers, an oscillator, and a driver. Each transceiver performs signal conditioning for RF signals transmitted and received via an associated set of at least one antenna. The oscillator generates local oscillator (LO) signals used by the first and second transceivers for frequency conversion between baseband and RF. The driver receives the LO signals from the oscillator and drives the LO signals from the transceiver module.

According to yet another embodiment, a transceiver module for use in a station equipped with multiple antennas is described which includes means for performing signal conditioning for RF signals transmitted and received via at least two antennas, means for generating LO signals used for frequency conversion between baseband and RF, and means for driving the LO signals from the transceiver module.

Various aspects and embodiments of the invention are described in further detail below.

BRIEF DESCRIPTION OF THE DRAWINGS

FIG. 2A shows a remote front-end for a time division duplexed (TDD) system.

FIG. 2B shows a remote front-end for a frequency division duplexed (FDD) system.

DETAILED DESCRIPTION

The word "exemplary" is used herein to mean "serving as an example, instance, or illustration." Any embodiment described herein as "exemplary" is not necessarily to be construed as preferred or advantageous over other embodiments.

Figure 1:
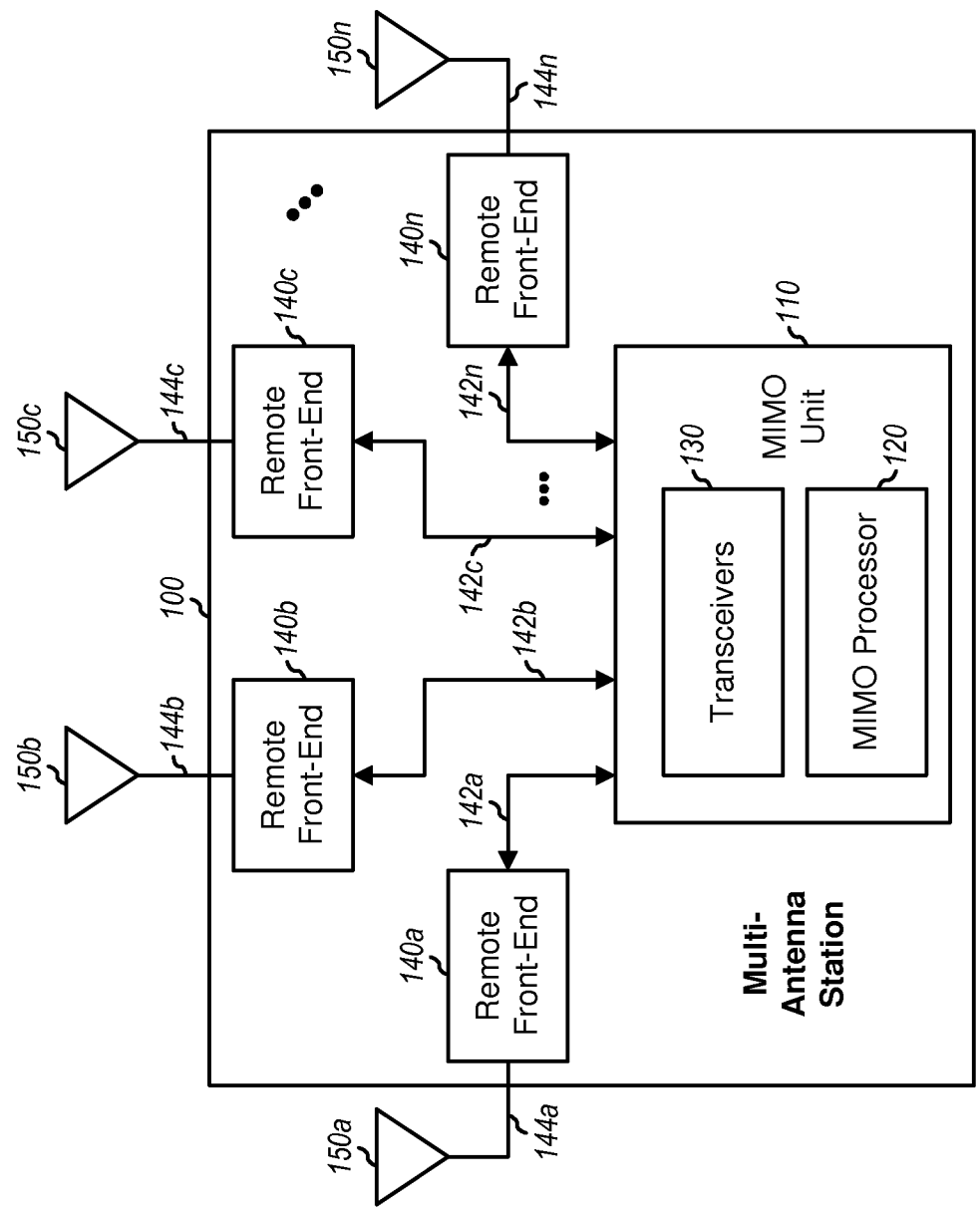
FIG. 1 shows a multi-antenna station.

FIG. 1 shows a block diagram of a multi-antenna station 100, which is equipped with N antennas 150a through 150n, where N≧2. Multi-antenna station 100 may be a wireless communication device, a user terminal, a television, a digital video disc (DVD) player, an audio/video (AV) equipment, a consumer electronics unit, or some other device or apparatus. In the following description, a reference numeral with a character (e.g., "150a") denotes a specific instance or embodiment of an element, block, or unit. A reference numeral without a character (e.g., "150") can denote all of the elements with that reference numeral (e.g., antennas 150a through 150n) or any one of the elements with that reference numeral, depending on the context in which the reference numeral is used.

Multi-antenna station 100 includes a MIMO unit 110 and N remote front-ends (RFEs) 140a through 140n for N antennas 150a through 150n, respectively. MIMO unit 110 includes a MIMO processor 120 and N transceivers 130. MIMO processor 120 performs digital processing for data transmission and reception. N transceivers 130 perform signal conditioning (e.g., amplification, filtering, frequency upconversion/downconversion, and so on) on the RF signals for the N antennas 150. N transceivers 130 couple to N remote front-ends 140a through 140n via cables 142a through 142n, respectively. Remote front-ends 140a through 140n further couple to N antennas 150a through 150n, respectively, via cables 144a through 144n, respectively. Antennas 150 may be located either close to or some distance away from MIMO unit 110, depending on the design of multi-antenna station 100.

Remote front-ends 140 condition (e.g., amplify and filter) RF modulated signals received from transceivers 130 and generate RF output signals for transmission from antennas 150. Remote front-ends 140 also condition RF input signals received from antennas 150 and generate conditioned RF input signals for transceivers 130. Remote front-ends 140 are located as close as possible to antennas 150 to reduce the signal loss in cables 144 between remote front-ends 140 and antennas 150.

Remote front-ends 140 may be optional, and may or may not be installed depending on various factors such as the supported applications, the desired performance, cost, and so on. Remote front-ends 140 may be installed to reduce signal loss between antennas 150 and transceivers 130, which may be desirable or necessary if the distance between the antennas and the transceivers is relatively long and the supported applications require high data rates. Remote front-ends 140 may be omitted for lower rate applications and/or if the distance between antennas 150 and transceivers 130 is relatively short. If remote front-ends 140 are omitted, then antennas 150 couple directly to transceivers 130 via cables 142.

FIG. 2A shows a block diagram of an embodiment of a remote front-end 140v, which may be used for each of remote front-ends 140a through 140n in FIG. 1. Remote front-end 140v may be used for a TDD communication system that transmits data on the downlink and uplink on the same frequency band at different times. For example, data may be sent on one link (e.g., downlink) in a first portion or phase of each TDD frame, and data may be sent on the other link (e.g., uplink) in a second portion of each TDD frame. The first and second portions may be static or may change from TDD frame to TDD frame.

For the embodiment shown in FIG. 2A, remote front-end 140v includes switches 210 and 240, a power amplifier (PA) 220, a low noise amplifier (LNA) 230, and a bandpass filter 250. Switch 210 couples to a first port of remote front-end 140v, which further couples to a transceiver 130. Filter 250 couples to a second port of remote front-end 140v, which further couples to an antenna 150. Switches 210 and 240 receive a transmit/receive (T/R) control signal that indicates whether RF signals are being transmitted or received by multi-antenna station 100. Each switch couples its input to a "T" output during the transmit portion and to an "R" output during the receive portion. The transmit and receive portions are indicated by the T/R control signal. Switch 210 allows remote front-end 140v to receive an RFE input signal from transceiver 130 and send an RFE output signal to the transceiver via a single port. This simplifies the connection between remote front-end 140v and transceiver 130.

For the transmit path, which is active during the transmit portion, switch 210 receives an RF modulated signal (which is the RFE input signal) from transceiver 130 via the first port and routes this RFE input signal to power amplifier 220. Power amplifier 220 amplifies the RFE input signal with a fixed or variable gain and provides the desire output signal level. Switch 240 receives the amplified RFE input signal from power amplifier 220 and routes this signal to filter 250. Filter 250 filters the amplified RFE input signal to remove out-of-band noise and undesired signal components and provides an RF output signal via the second port to antenna 150.

For the receive path, which is active during the receive portion, filter 250 receives an RF input signal from antenna 150 via the second port, filters this RF input signal, and provides a filtered RF input signal to switch 240. Switch 240 routes the filtered RF input signal to LNA 230, which amplifies the signal. LNA 230 may also have a fixed or variable gain and is designed to provide the desire performance (e.g., to have the desired noise figure). Switch 210 receives the amplified RF input signal (which is the RFE output signal) from LNA 230 and provides the RFE output signal via the first port to transceiver 130.

Remote front-end 140v may be used to provide low loss for the RF signals sent between the remote front-end and transceiver 130. Remote front-end 140v may also be used to provide the desired output power level for the RF output signal transmitted from antenna 150. For example, transceiver 130 may be implemented on an RFIC and may be capable of providing low or medium output power level for the RF modulated signal sent to remote front-end 140v. Power amplifier 220 within remote front-end 140v may then provide amplification and high output power level for the RF output signal.

Power amplifier 220 and/or LNA 230 may be powered down whenever possible to reduce power consumption. For example, power amplifier 220 (and possibly LNA 230) may be powered down when multi-antenna station 100 is idle. To further reduce power consumption, power amplifier 220 may be powered down during the receive portion based on the T/R control signal, and LNA 230 may be powered down during the transmit portion based on the T/R control signal, as indicated by the dashed line in FIG. 2A.

FIG. 2B shows an embodiment of a remote front-end 140w that may be used for an FDD system. An FDD communication system can simultaneously transmit data on the downlink and uplink at the same time on different frequency bands. For the embodiment shown in FIG. 2B, remote front-end 140w includes duplexers 212 and 242, power amplifier 220, and LNA 230. For the transmit path, duplexer 212 filters the RFE input signal received via the first port and routes the filtered RFE input signal to power amplifier 220. Duplexer 242 filters the output signal from power amplifier 220 and provides the filtered signal as the RF output signal to the second port. For the receive path, duplexer 242 filters the RF input signal received via the second port and routes this signal to LNA 230. Duplexer 212 filters the output signal from LNA 230 and provides this signal as the RFE output signal to the first port. The T/R control signal is not needed for remote front-end 140w.

FIGS. 2A and 2B show specific designs for remote front-ends 140v and 140w, respectively. In general, the transmit and receive paths may each include one or more stages of amplifier, filter, and so on. The transmit and receive paths may also include fewer, different, and/or additional circuit blocks not shown in FIGS. 2A and 2B. For example, switch 210 in FIG. 2A may be omitted, and the RFE input and output signals may be sent via separate cables.

For the embodiment shown in FIG. 2A, remote front-end 140v receives (1) the T/R control signal that toggles switches 210 and 240 between the "T" and "R" output ports and (2) a DC supply for the active circuits, e.g., power amplifier 220 and LNA 230. The RF signals, T/R control signal, and DC supply may be provided to remote front-end 140v in various manners, as described below.

Figure 3:
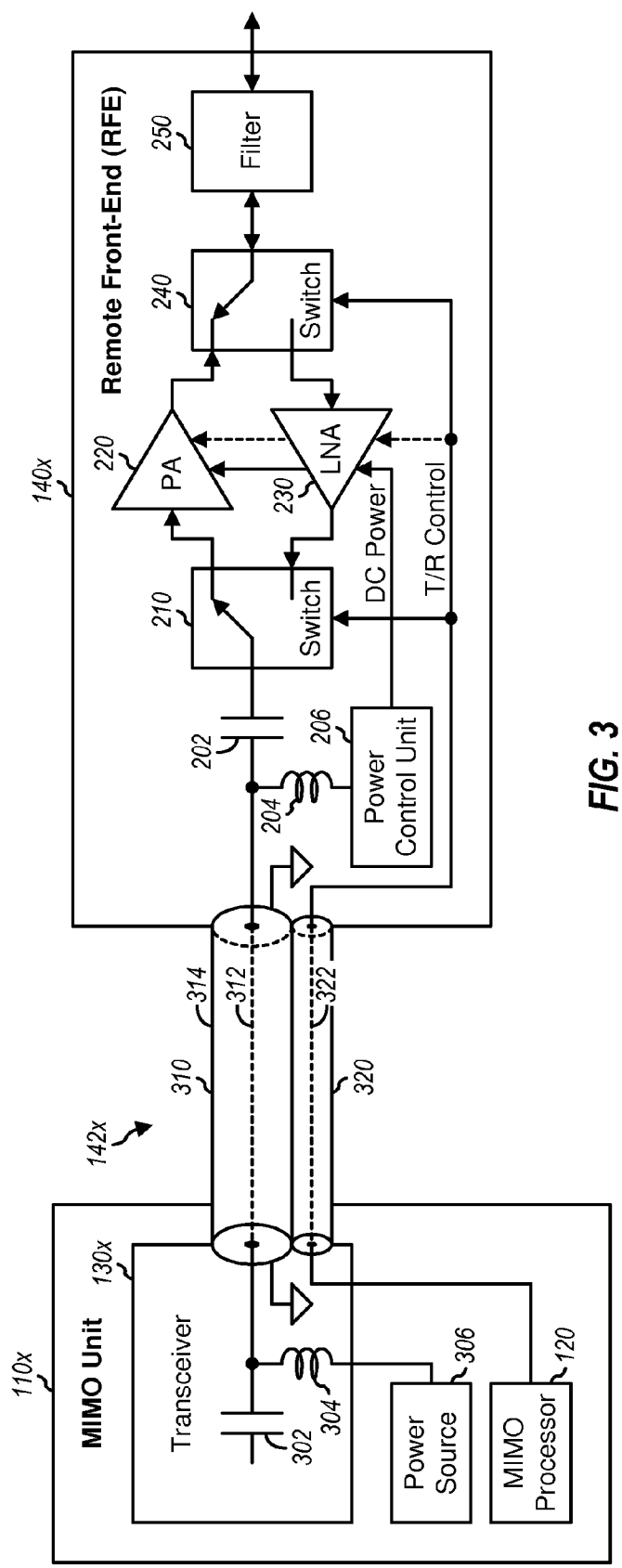
FIGS. 3, 4 and 5 show three embodiments for coupling the remote front-end to a transceiver.

FIG. 3 shows a first embodiment for coupling a remote front-end 140x to a transceiver 130x via a cable 142x. Remote front-end 140x includes all of the circuit blocks in remote front-end 140v, which is described above in FIG. 2A. Remote front-end 140x further includes a capacitor 202, an inductor 204, and a power control unit 206. Capacitor 202 couples between the first port of remote front-end 140x and the input of switch 210. Capacitor 202 performs AC coupling of the RFE input/output signals and also performs DC blocking of the DC supply voltage. Inductor 204, which is often called an RF choke, couples between the first port of remote front-end 140x and power control unit 206. Inductor 204 routes the DC supply voltage received via a coaxial cable 310 to power control unit 206 and further performs RF blocking. Power control unit 206 receives the DC supply voltage via inductor 204 and provides the supply voltage for power amplifier 220, LNA 230, and other active circuit blocks (if any) within remote front-end 140x.

At transceiver 130x, an AC coupling/DC blocking capacitor 302 couples the RF signals between transceiver 130x and coaxial cable 310. An inductor 304 couples the DC supply voltage from a power source 306 to coaxial cable 310. Capacitor 302 and inductor 304 at transceiver 130x perform the same function as capacitor 202 and inductor 204, respectively, at remote front-end 140x.

For the embodiment shown in FIG. 3, cable 142x includes coaxial cable 310 and a messenger cable 320. Coaxial cable 310 has a center conductor 312 and an outer shield 314. Center conductor 312 carries RF signals as well as the DC supply voltage between transceiver 130x and remote front-end 140x. Outer shield 314 is electrically grounded at both transceiver 130x and remote front-end 140x. Coaxial cable 310 is designed to have the proper impedance (e.g., 50Q or 75Q) at the operating frequency. Messenger cable 320 has a center conductor 322 that carries the T/R control signal from MIMO processor 120 to remote front-end 140x. Messenger cable 320 may share/utilize outer shield 314 of coaxial cable 310 (as shown in FIG. 3) or may be provided with its own shield (not shown in FIG. 3). Messenger cable 320 is designed to provide good performance for the T/R control signal, e.g., good waveform fidelity for the leading and trailing transitions in the T/R control signal. Coaxial cable 310 and messenger cable 320 may be bundled together for easy handling. For example, both cables 310 and 320 may be coated with an outer insulation material (e.g., plastic). In this case, only one bundled cable connects remote front-end 140x to transceiver 130x and carries all of the required signals and power, e.g., the RF signals, T/R control signal, and DC power.

Figure 4:
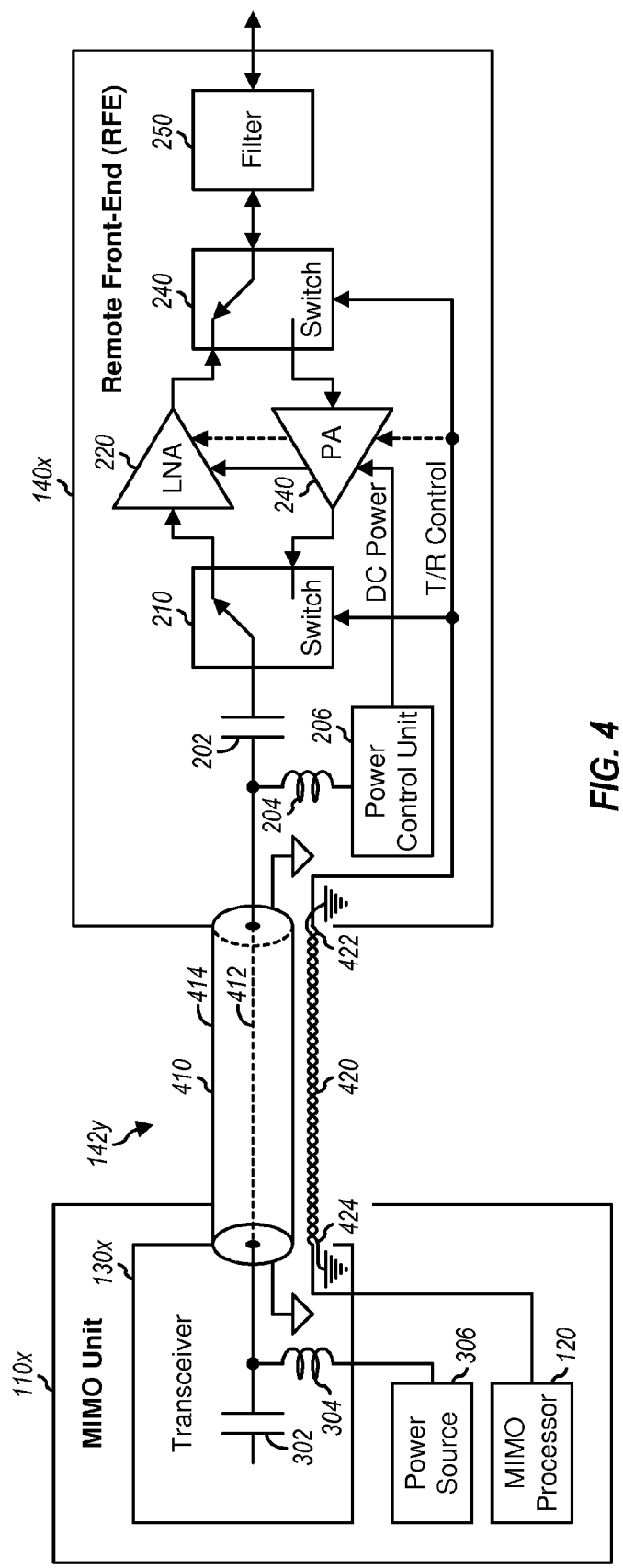

FIG. 4 shows a second embodiment for coupling remote front-end 140x to transceiver 130x via a cable 142y. For this embodiment, cable 142y includes a coaxial cable 410 and a twisted wire 420. Coaxial cable 410 has (1) a center conductor 412 that carries the RF signals and DC supply and (2) an outer shield 414 that is electrically grounded at both transceiver 130x and remote front-end 140x. Twisted wire 420 has a first conductor 422 that carries the T/R control signal and a second conductor 424 that is electrically grounded at both transceiver 130x and remote front-end 140x. Twisted wire 420 provides good performance for the T/R control signal. Coaxial cable 410 may be any coaxial cable that is commercially available, and twisted wire 420 may also be any commercially available twisted wire. Coaxial cable 410 and twisted wire 420 may be bundled together for easy handling. For example, coaxial cable 410 and twisted wire 420 may be coated with an outer insulation material.

Figure 5:
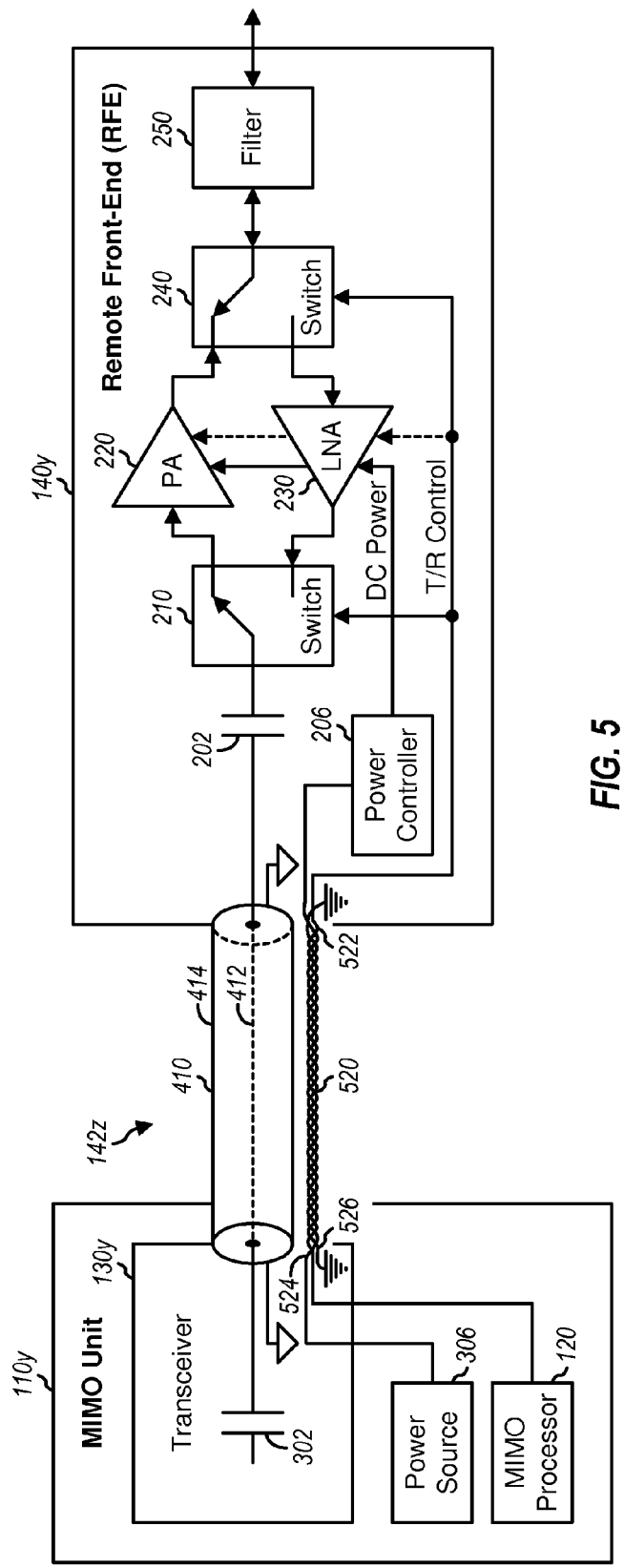

FIG. 5 shows a third embodiment for coupling a remote front-end 140y to a transceiver 130y via a cable 142z. For this embodiment, cable 142z includes coaxial cable 410 and a twisted wire 520. Twisted wire 520 has a first conductor 522 that carries the T/R control signal, a second conductor 524 that carries the DC supply, and a third conductor 526 that is grounded at both transceiver 130y and remote front-end 140y. Twisted wire 520 provides good performance for the T/R control signal and may be any commercially available twisted wire with three or more conductors. Coaxial cable 410 and twisted wire 520 may be bundled together for easy handling. For the embodiment shown in FIG. 5, AC coupling/DC blocking capacitors and RF choke inductors are not needed at transceiver 130y and remote front-end 140y because the DC supply is provided via a dedicated wire instead of the center conductor of coaxial cable 410.

FIGS. 3 through 5 show three exemplary embodiments for sending signals and DC power to a remote front-end. Signals and DC power may also be sent in other manners. For example, a single coaxial cable may be used to send the RF signals, T/R control signal, and DC supply. The T/R control signal may be conveyed by a change in the DC supply voltage, e.g., a Vhigh voltage for logic high on the T/R control signal and a Vlow voltage for logic low on the T/R control signal. The T/R control signal may also be conveyed by pulses sent to indicate the start of the transmit and receive portions. For example, a pulse of a first polarity and/or a first width may be sent at the start of the transmit portion, and a pulse of a second polarity and/or a second width may be sent at the start of the receive portion. In general, each signal may be sent via a wire, a cable, or some other medium capable of propagating that signal with a tolerable amount of loss.

The DC supply may be shut off if the remote front-ends are not installed. A sensing circuit within power source 306 in MIMO unit 110 can detect whether the remote front-ends are installed. This detection may be achieved in various manners. For example, the amount of current being consumed may be sensed, and no current consumption would indicate that the remote front-ends are not installed. As another example, the impedance of the wire carrying the DC supply may be sensed, and high or open impedance would indicate that the remote front-ends are not installed. If the remote front-ends are not installed, then power source 306 can shut off the DC supply.

Figure 6:
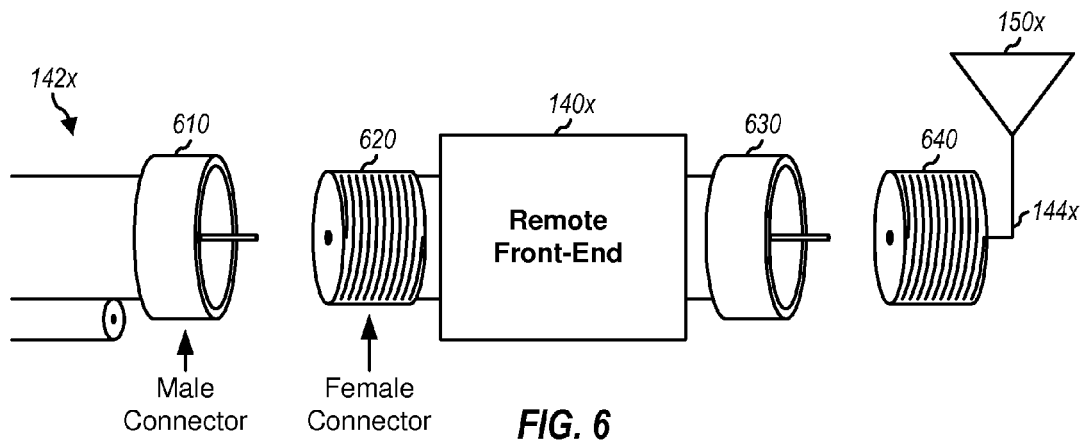
FIG. 6 shows connection of the remote front-end to a cable and an antenna.

FIG. 6 shows a diagram of an embodiment for connecting remote front-end 140x to cable 142x and antenna 150x. Remote front-end 140x has a female connector 620 for the first port and a male connector 630 for the second port. Cable 142x has a male connector 610 that couples to female connector 620 of remote front-end 140x. Male connector 630 of remote front-end 140x couples to a female connector 640 for antenna 150x.

For the embodiment shown in FIG. 6, remote front-end 140x is coupled as close as possible to antenna 150x to reduce loss for the RF input/output signals. Connector 640 may represent the bulk of cable 144x between remote front-end 140x and antenna 150x. The use of different connectors 620 and 630 for the first and second ports of remote front-end 140x prevents backward installation of remote front-end 140x since (1) the first port can couple to cable 142x only via connector 620 and (2) the second port can couple to antenna 150x only via connector 630.

The use of complementary types of connectors (e.g., female connector 620 and male connector 630) for the first and second ports of remote front-end 140x also allows for optional installation of remote front-end 140x. For example, remote front-end 140x may be installed if lower loss is desired for applications requiring high data rates. Remote front-end 140x may be omitted for applications that can tolerate more loss. In this case, cable 142x would couple directly to antenna 150x via connectors 610 and 640.

FIG. 6 shows a specific embodiment for connecting remote front-end 140x to cable 142x and antenna 150x. Other types of connectors may also be used for a remote front-end to achieve the desired connection, prevent backward installation of the remote front-end, and allow for optional installation of the remote front-end.

Figure 7:
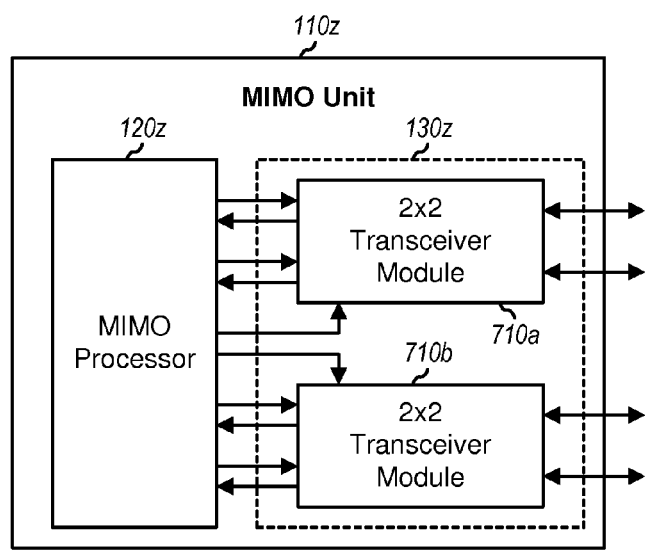
FIG. 7 shows a block diagram of a MIMO unit within the multi-antenna station.

FIG. 7 shows a block diagram of a MIMO unit 110z, which is one embodiment of MIMO unit 110 in FIG. 1. MIMO unit 110z supports four antennas (N 4) and includes a MIMO processor 120z and two 2×2 transceiver modules 710a and 710b. Each 2×2 transceiver module 710 includes two transceivers for two antennas. Each transceiver includes transmit circuitry and receive circuitry for one antenna. Each 2×2 transceiver module may be fabricated on a separate IC die, or multiple 2×2 transceiver modules may be fabricated on the same IC die. MIMO processor 120z couples to each transceiver module 710 via a respective set of baseband signals and control signals.

Figure 8:
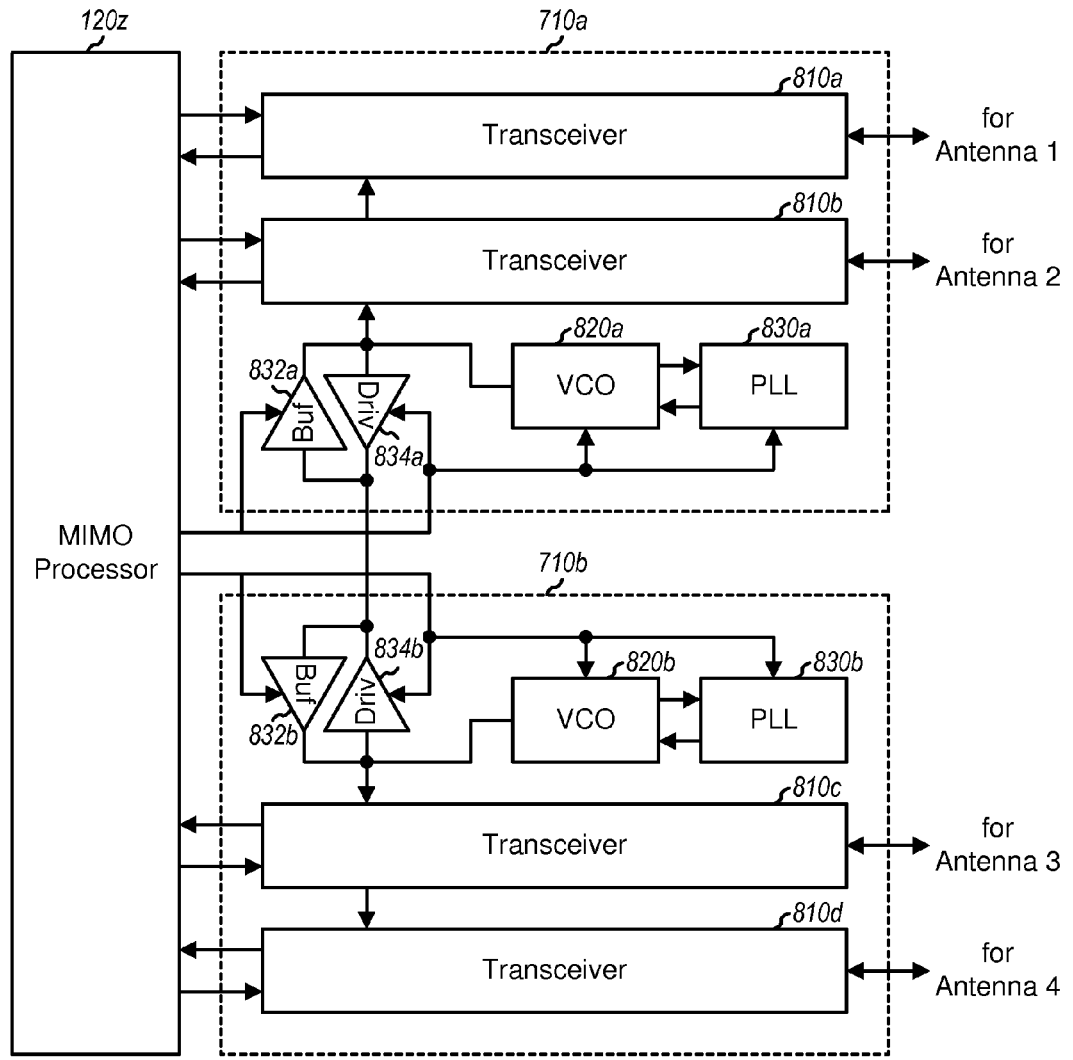
FIG. 8 shows a block diagram of 2×2 transceiver modules.

FIG. 8 shows a block diagram of an embodiment of 2×2 transceiver modules 710a and 710b for MIMO unit 110z. For this embodiment, transceiver module 710a includes two transceivers 810a and 810b, a voltage controlled oscillator (VCO) 820a, a phase locked loop (PLL) 830a, an input buffer (Buf) 832a, and an output driver (Driv) 834a. Transceiver module 710b includes two transceivers 810c and 810d, a VCO 820b, a PLL 830b, an input buffer 832b, and an output driver 834b. Each transceiver 810 receives and processes a baseband input signal from MIMO processor 120z and generates an RF modulated signal for one antenna 150. Each transceiver 810 also receives and processes an RFE output signal from an associated remote front-end 140 (or an RF input signal from an associated antenna 150) and generates a baseband input signal for MIMO processor 120z.

When transceiver modules 710a and 710b are used to support four antennas, transceiver module 710a serves as the master module and transceiver module 710b is the slave module. VCO 820a and PLL 830a within transceiver module 710a are enabled and generate local oscillator (LO) signals used by all four transceivers 810a through 810d for frequency upconversion and downconversion. VCO 820b and PLL 830b within transceiver module 710b are disabled, driver 834b and buffer 832a are also disabled, and driver 834a and buffer 832b are enabled. The LO signals from VCO 820a are provided via driver 834a and buffer 832b to transceivers 810c and 810d in the slave transceiver module 710b.

2×2 transceiver modules (as oppose to modules with more transceivers) may be efficiently used for multi-antenna stations with different numbers of antennas. For a multi-antenna station equipped with two antennas, only one 2×2 transceiver module 710 is needed, and no additional and unnecessary circuitry is wasted. In this case, VCO 820 and PLL 830 are enabled to generate the LO signals for the two transceivers 810 in the transceiver module, and driver 834 and buffer 832 are disabled. For a multi-antenna station equipped with four antennas such as the one shown in FIGS. 7 and 8, two 2×2 transceiver modules may be used for the four antennas, and only a small amount of redundant circuitry is not used.

Figure 9:
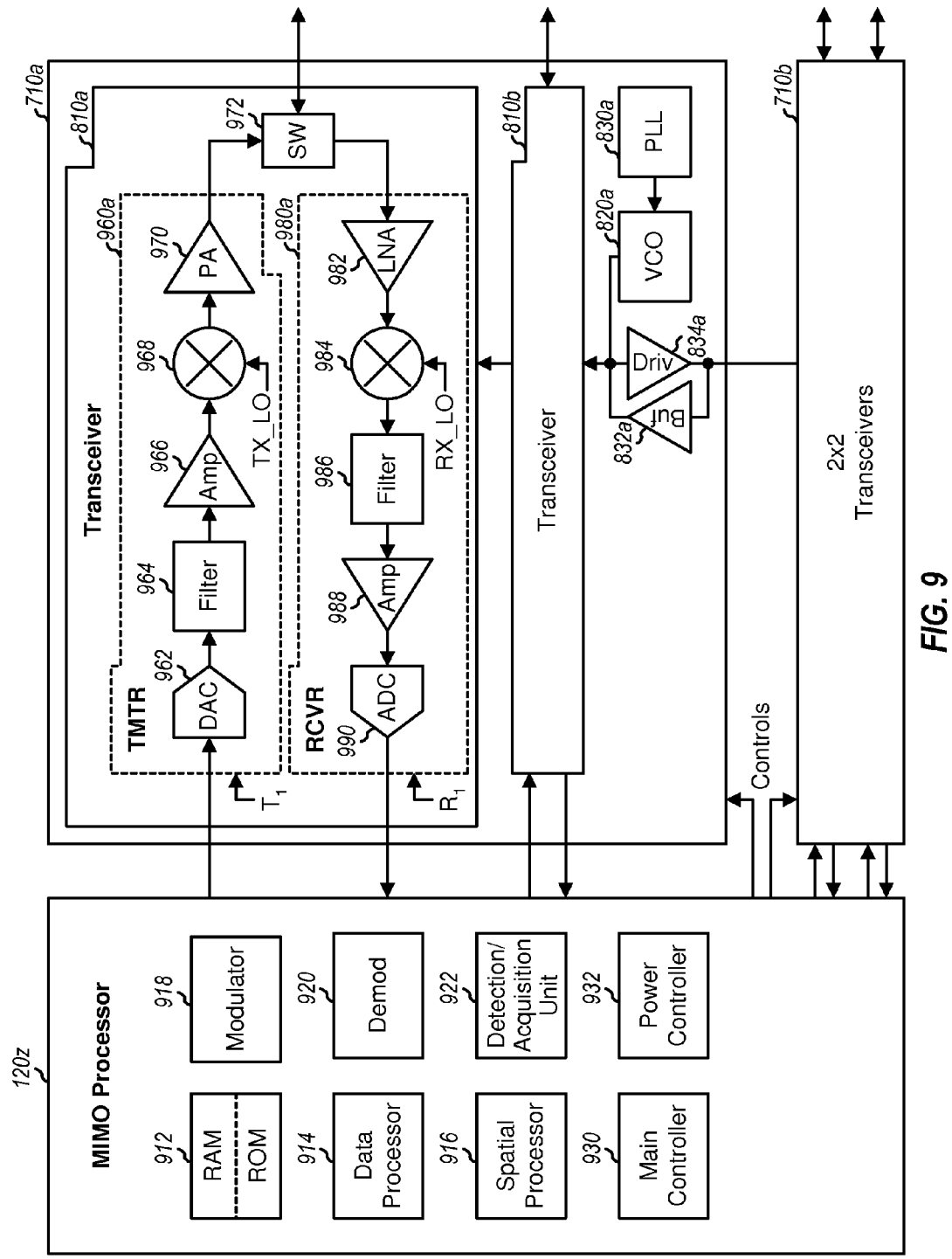
FIG. 9 shows a block diagram of the transceivers within the transceiver modules.

FIG. 9 shows a block diagram of an embodiment of transceivers 810 within 2×2 transmitter modules 710. Each transceiver 810 includes a transmitter unit (TMTR) 960 and a receiver unit (RCVR) 980. The transmitter and receiver units may be implemented with a super-heterodyne architecture or a direct-conversion architecture. For the super-heterodyne architecture, frequency conversion between RF and baseband is performed in multiple stages, e.g., from RF to an intermediate frequency (IF) in one stage, and from IF to baseband in another stage. For the direct-conversion architecture, frequency conversion is performed in a single stage, e.g., from RF directly to baseband. For simplicity, FIG. 9 shows an embodiment of transmitter unit 960 and receiver unit 980 implemented with the direct-conversion architecture.

Within transmitter unit 960, a digital-to-analog converter (DAC) 962 receives a stream of digital chips (which is the baseband input signal) from MIMO processor 120z, converts the chips to analog, and provides an analog baseband signal. A filter 964 then filters the analog baseband signal to remove undesired images generated by the digital-to-analog conversion and provides a filtered baseband signal. An amplifier (Amp) 966 amplifies and buffers the filtered baseband signal and provides an amplified baseband signal. A mixer 968 modulates a TX_LO signal from VCO 820a with the amplified baseband signal and provides an upconverted signal. A power amplifier 970 amplifies the upconverted signal and provides an RF modulated signal, which is routed through a switch (SW) 972 and provided to an associated remote front-end 140 for one antenna.

Within receiver unit 980, an LNA 982 receives an RFE output signal from the associated remote front-end 140 or an RF input signal from an associated antenna 150 via switch 972. LNA 982 amplifies the received RF signal and provides a conditioned signal having the desired signal level. A mixer 984 demodulates the conditioned signal with an RX_LO signal from VCO 820a and provides a downconverted signal. A filter 986 filters the downconverted signal to pass the desired signal components and to remove noise and undesired signals that may be generated by the frequency downconversion process. An amplifier 988 amplifies and buffers the filtered signal and provides an analog baseband signal. An analog-to-digital converter (ADC) 990 digitizes the analog baseband signal and provides a stream of samples (which is the baseband output signal) to MIMO processor 120z.

FIG. 9 shows an exemplary design for the transmitter and receiver units. For this design, the DAC and ADC are shown as being parts of the transmitter unit and receiver unit, respectively. In general, the transmitter and receiver units may each include one or more stages of amplifier, filter, mixer, and so on, which may be arranged in a manner different from that shown in FIG. 9. The transmitter and receiver units may or may not include the DAC and ADC, respectively.

FIG. 9 also shows an embodiment of MIMO processor 120z, which includes various processing units that perform digital processing for data transmission and reception. Within MIMO processor 120z, a data processor 914 performs encoding, interleaving, and symbol mapping for data transmission and symbol demapping, deinterleaving, and decoding for data reception. A spatial processor 916 performs transmitter spatial processing (e.g., for beamforming, spatial multiplexing, and so on) for data transmission and receiver spatial processing (e.g., receiver match filtering) for data reception. A modulator 918 performs modulation, e.g., for orthogonal frequency division multiplexing (OFDM). A demodulator 920 performs demodulation, e.g., for OFDM. A detection/acquisition unit 922 performs processing to detect and acquire signals from other transmitting stations. A main controller 930 controls the operation of various processing units within multi-antenna station 100 and generates the various controls for transceivers 810 and remote front-ends 140. For example, main controller 930 may generate the T/R control signal for remote front-ends 140. A power controller 932 performs power management for multi-antenna station 100. For example, power controller 932 may determine whether or not to send DC power to the remote front-ends. A random access memory (RAM) and a read only memory (ROM) 912 store data and program codes used by various processing units within MIMO processor 120z.

For clarity, the description above shows each remote front-end being coupled to one antenna, and each transceiver processing the RF signals for one antenna. In general, each remote front-end and/or each transceiver may be associated with a set of one or more antennas. If a remote front-end or transceiver is associated with multiple antennas, then these antennas may be viewed as a single (distributed) "antenna" for the remote front-end or transceiver.

The remote front-ends and transceiver modules described herein may be implemented on RF integrated circuits (RFICs), with discrete components, and so on. For example, each remote front-end may be implemented on one RFIC. Each transceiver module may be implemented on one RFIC, or multiple transceiver modules may be implemented on one RFIC, possibly along with other circuitry. The remote front-ends and transceiver modules may be fabricated with various integrated circuit (IC) processes such as complementary metal oxide semiconductor (CMOS), bipolar, bipolar-CMOS (Bi-CMOS), gallium arsenide (GaAs), and so on. For example, each remote front-end may be fabricated on one GaAs RFIC. Certain circuit components (e.g., inductors) may be printed on an IC die or implemented with Micro-Electro-Mechanical Systems (MEMS) technologies.

For simplicity, the control signals used to control the operation of the remote front-ends and the transceiver modules are shown as being generated by MIMO processor 120 in the description above. In general, these control signals may be generated by various units such as, for example, an application specific integrated circuit (ASIC), a digital signal processor (DSP), a digital signal processing devices (DSPD), a programmable logic device (PLD), a field programmable gate array (FPGA), a processor, a controller, a micro-controller, a microprocessor, or some other electronic unit designed to perform the functions described herein.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A station equipped with a plurality of antennas, comprising:
a plurality of transceivers, each transceiver performing signal conditioning for radio frequency (RF) signals transmitted and received via an associated antenna, wherein the plurality of transceivers are arranged in pairs, each pair of transceivers being implemented as a separate module, the module for each pair of transceivers comprises:
an oscillator to generate local oscillator (LO) signals for the transceivers in the pair,
a driver to receive the LO signals from the oscillator and to drive the LO signals external to the module via an output of the module, and
a buffer to receive external LO signals from another transceiver module and to provide buffered LO signals, based on the received external LO signals, to the transceivers in the pair for frequency conversion between baseband and RF,
wherein multiple modules are implemented for multiple pairs of transceivers, and wherein one module is designated to generate local oscillator (LO) signals for all transceivers in the multiple modules, the oscillator is disabled in each module that is not designated; and
a plurality of remote front-ends, each remote front-end coupled to an associated transceiver and an associated antenna, each remote front-end amplifying a first RF signal received from the associated transceiver to generate a first amplified RF signal for transmission from the associated antenna and further amplifying a second RF signal received from the associated antenna to generate a second amplified RF signal for transmission to the associated transceiver.

2. The station of claim 1, further comprising:
a plurality of cables, each cable coupling one transceiver to the associated remote front-end.

3. The station of claim 2, wherein each of the plurality of cables comprises a first cable to carry the first RF signal and the second amplified RF signal between the transceiver and the associated remote front-end.

4. The station of claim 3, wherein the first cable further carries DC power for the associated remote front-end.

5. The station of claim 3, wherein each of the plurality of cables further comprises a second cable to carry at least one control signal for the associated remote front-end.

6. The station of claim 5, wherein the first and second cables are bundled together.

* * * * *